United States Patent [19]
Aoshima

[11] Patent Number: 5,382,789
[45] Date of Patent: Jan. 17, 1995

[54] NEAR FIELD SCANNING OPTICAL MICROSCOPE

[75] Inventor: Shinichiro Aoshima, Hamamatsu, Japan

[73] Assignee: Hamamatsu Photonics K.K., Hamamatsu, Japan

[21] Appl. No.: 864,238

[22] Filed: Apr. 6, 1992

[30] Foreign Application Priority Data

Apr. 5, 1991 [JP] Japan .................................. 3-073054

[51] Int. Cl.⁶ ............................................... H01J 3/14
[52] U.S. Cl. ..................................... 250/216; 250/235
[58] Field of Search ............... 250/306, 307, 234, 235, 250/236, 216, 458.1, 459.1, 461.1, 461.2, 222.2, 227.20, 227.21, 227.26, 214 VT; 356/318; 359/368, 393, 202, 221, 389

[56] References Cited

U.S. PATENT DOCUMENTS

| | | | |
|---|---|---|---|
| 4,136,950 | 1/1979 | Labrum et al. | 250/222.2 |
| 4,662,747 | 5/1987 | Isaacson et al. | |
| 4,786,813 | 11/1988 | Svanberg et al. | 250/458.1 |
| 4,917,462 | 4/1990 | Lewis et al. | 250/216 |
| 4,920,386 | 4/1990 | Tsuchiya et al. | 250/214 VT |
| 5,105,305 | 4/1992 | Betzig et al. | 250/227.14 |
| 5,138,159 | 8/1992 | Takase et al. | |
| 5,191,393 | 3/1993 | Hignette et al. | 250/560 |

FOREIGN PATENT DOCUMENTS

| | | |
|---|---|---|
| 0112401 | 7/1984 | European Pat. Off. |
| 0296262 | 12/1988 | European Pat. Off. |
| 0459392 | 12/1991 | European Pat. Off. |
| 4124090 | 1/1992 | Germany |

OTHER PUBLICATIONS

O plus E, 1989, pp. 110–117.
Reddick et al., "Photon Scanning Tunneling Microscopy", Rev. Sci. Instrum. 61, Dec. 1990.
Hamers, "Ultrafast Time Resolution In Scanned Probe Microscopies: Surface Photovoltage on Si(111)–(7X7)", J. Vac. Sci. Technol. B9(2), Mar./Apr. 1991.
Ferrell et al., "The Photon Scanning Tunneling Microscope", J. Vac. Sci. Technol. B9 (2), Mar./Apr. 1991.
Wehry, "Modern Fluorescence Spectroscopy", vol. 1, 1976, pp. 53–56.
Durig et al., "Near-field Optical Scanning Microscopy With Tunnel-distance Regulation", vol. 30, No. 5, Sep. 1976 pp. 478–483.
Jiang et al., "A Photon Scanning Tunneling Microscope Using an AlGaAs Laser", vol. 30, No. 9A, Sep. 1991, pp. 2107–2111.

Primary Examiner—David C. Nelms
Assistant Examiner—K. Shami
Attorney, Agent, or Firm—Cushman, Darby & Cushman

[57] ABSTRACT

A light source generates probe light to be radiated on a sample. An optical probe has a pin hole at its distal end and selectively supplies the probe light to the sample through the pin hole. An optical detecting unit detects light emerging from the sample and converts it to an electrical signal. The light source generates the probe light whose intensity changes in the pulse-like manner. The optical detecting unit detects the light emerging from the sample in synchronism with an increase in probe light which changes in the pulse-like manner and converts it to the electric signal. Therefore, noise which is conventionally converted to an electrical signal can be decreased even when the probe light which changes in the pulse-like manner is decreased, and measurement can be performed at a high S/N ratio even if the pin hole diameter is small. As a result, the resolution of a near field scanning optical microscope can be improved.

18 Claims, 2 Drawing Sheets

NEAR FIELD SCANNING OPTICAL MICROSCOPE

BACKGROUND OF THE INVENTION

1. Field of the Invention

The present invention relates to a near field scanning optical microscope for imaging a surface of a sample to be examined.

2. Description of the Related Art

As a conventional near field scanning optical microscope, a microscope is known in which light from a light source is radiated onto a sample to be examined through a pin hole or aperture formed in the distal end of an optical probe, and light transmitted through the surface of the sample or fluorescence generated by the sample itself is focused by an objective lens of the microscope (refer to O plus E by S. Okazaki, September 1989, pp. 110–116 and so on). It is known that, in a near field scanning optical microscope of this type, the limit of its resolution substantially corresponds to the diameter of the pin hole or aperture.

When the diameter of the pin hole is decreased in order to improve the resolution, however, the energy radiated on its near or far field is abruptly decreased.

In comparison to a case in which the pin hole diameter is 5 nm, when the diameter is decreased to $\frac{1}{2}$, the amount of light reaching a photodetector is calculated to be decreased to about 1/60. That is, when the pin hole diameter is decreased in order to improve the resolution, the amount of light reaching the photodetector is abruptly decreased, separation of signal and noise becomes difficult, and the lower limit of signal detection is restricted. In practice, the resolution is restricted in accordance with the lower limit of detection.

SUMMARY OF THE INVENTION

It is, therefore, an object of the present invention to provide a near field scanning optical microscope having an improved resolution in which a light source emits light in a pulse-like manner and a photodetector is operated in synchronism with the pulsed light from the light source, thereby improving a lower detection limit.

It is another object of the present invention to provide a near field scanning optical microscope comprising a light source for generating light to be radiated on a sample set position, and changing the intensity of the light in a pulse-like manner, near field optical means having an aperture facing to the sample set position, detecting means for detecting light output from the near field optical means in synchronism with the intensity of the light generated by the light source.

According to the near field scanning optical microscope described above, the detecting means detects the light output from the near field optical means simultaneously with an increase in the intensity of the light from the light source or after a lapse of a predetermined period of time from the increase. For example, if the detecting means detects the light output only while the intensity of the light from the light source increases, the intensity of the light output can be increased relative to background stationary noise, and thus the S/N ratio can be increased. As a result, resolution of the near field scanning optical microscope can be improved.

It is still another object of the present invention to provide a near field scanning optical microscope whose near field optical means comprises optical probe means for supplying the light from the light source to the sample set position through the aperture and pickup means for picking up light from the sample set position.

It is still another object of the present invention to provide a near field scanning optical microscope whose near field optical means comprises supplying means for supplying the light from the light source to the sample set position and optical probe means for picking up the light from the sample set position through the aperture.

In the former microscope, the optical probe means can be caused to serve as the pickup means as well, and in the latter microscope, the optical probe means can be caused to serve as the supplying means as well.

It is still another object of the present invention to provide a near field scanning optical microscope capable of moving the aperture in a direction substantially perpendicular to the surface of the sample and scanning the sample two-dimensionally on a plane perpendicular to the moving direction of the aperture.

It is still another object of the present invention to provide a near field scanning optical microscope whose detecting means repeatedly detects the light from the near field optical means at a predetermined time interval after the light pulse from the light source rises.

It is still another object of the present invention to provide a near field scanning optical microscope for changing a time interval between time when the light pulse from the light source rises and time when the detecting means detects the light output from the near field optical means.

It is still another object of the present invention to provide a near field scanning optical microscope whose detecting means selectively separates and detects light having a predetermined wavelength different from that of the light generated by the light source.

It is still another object of the present invention to provide a near field scanning optical microscope further comprising a sub-probe means (e.g., an AFM or an STM) for measuring a physical amount, e.g., configurations of recesses and projections, of the sample.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

A near field scanning optical microscope according to an embodiment of the present invention will be described with reference to FIG. 1. In the near field scanning optical microscope of this embodiment, its near field optical means supplies probe light to a sample set position through an optical probe, and light emerging from the sample set position is detected by an objective lens.

Figure 1:
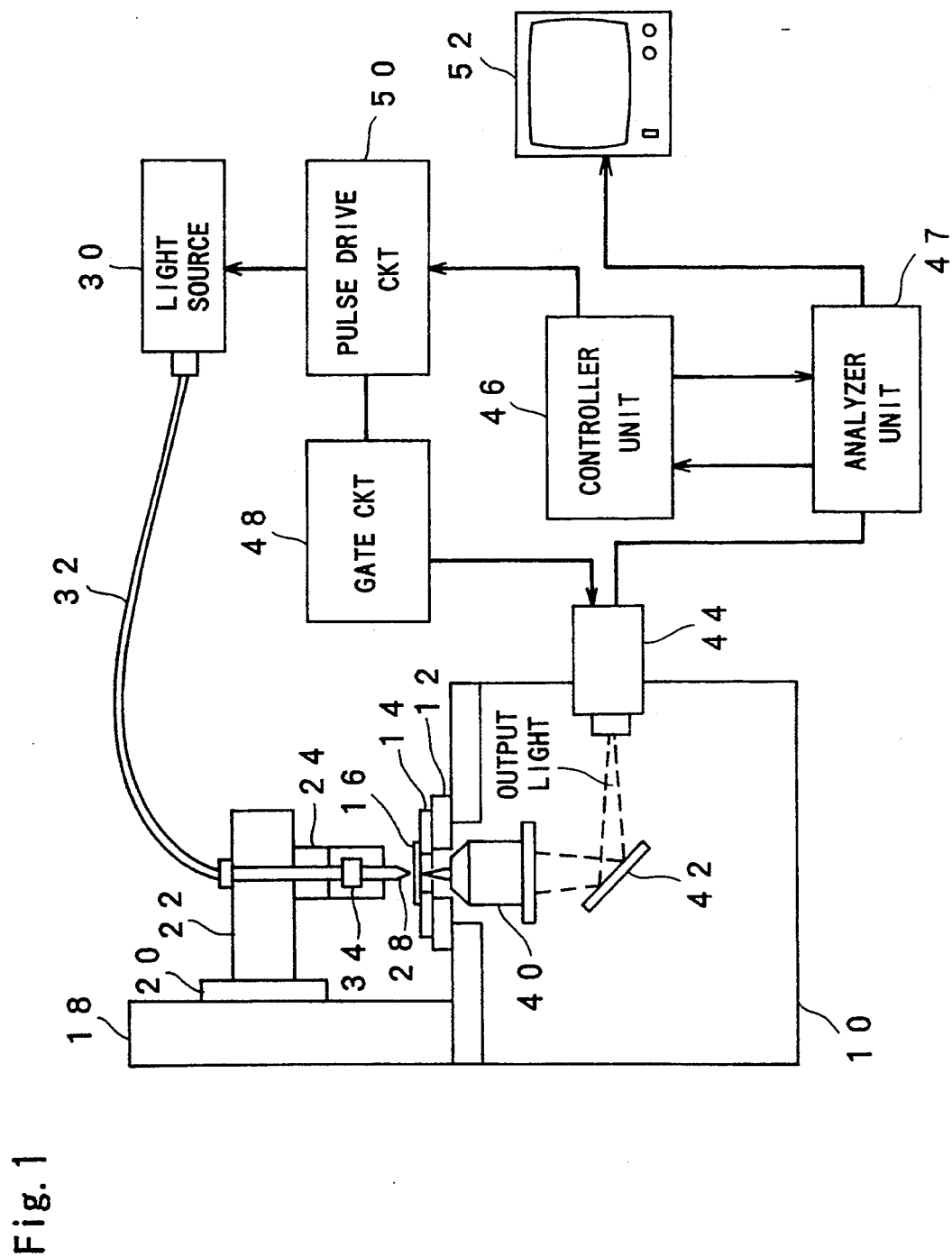
FIG. 1 is a view showing an arrangement of an embodiment of the present invention.

As shown in FIG. 1, an X-Y stage 12 is fixed on a base 10 of the near field scanning optical microscope. An X-Y scanning unit 14 using a piezoelectric element is disposed on the X-Y stage 12, and a thin film-like sample 16 as a target of enlarged observation is placed on a sample set position on the X-Y stage 12. The X-Y stage 12 enables manual position setting of the sample 16 in the X and Y directions (to-and-fro and left-and-right directions in FIG. 1). The X-Y scanning unit 14 enables electrical position control of the sample 16 in the X and Y directions. That is, the sample 16 can be scanned on the X-Y plane very accurately by the X-Y scanning unit 14 in accordance with electric signals.

An arm 22 is supported by a Z stage 20 and support column 18 extending from the base 10. A Z displacing unit 24 using a piezoelectric element is set under the arm 22, and an optical probe 28 is fixed on the distal end of the Z displacing unit 24. The Z stage 20 enables manual position setting of the optical probe 28 in the Z direction (vertical direction in FIG. 1). The Z displacing unit 24 enables electrical position control of the optical probe 28 in the Z direction.

Pulse-like probe light from a pulse light source 30 is incident on the optical probe 28 through an optical guide 32 and a self-focusing lens 34. The optical probe 28 is obtained by cutting an end portion of an optical fiber at an acute angle, covering a metal film, e.g., an Al film on the sharp end portion, and thereafter forming a small opening in the distal end of the covered sharp end portion. The optical probe 28 forms part of the near field optical means. A semiconductor laser excitation type mode-synchronized Nd:YLF laser or the like is used as the pulse light source 30. Probe light having a desired pulse width of about 50 pS and a desired pulse period of about 10 ns can be obtained by the pulse light source 30. The pulsed probe light emitted through an aperture or pin hole in the distal end of the optical probe 28 is radiated on the sample 16 close to the optical probe 28.

The probe light radiated on the sample 16 is modulated in accordance with the state of the sample 16. Exit light modulated by the sample 16 is focused by an objective lens 40 located below the sample 16. The objective lens 40 forms part of the near field optical means. The exit light focused by the objective lens 40 is incident on a gating photodetector 44 serving as a detecting means through a reflecting mirror 42. A streak camera is used as the gating photodetector 44. Then, the amount of exit light focused by the objective lens 40 can be measured in synchronism with a pulsed output of the probe light.

A controller unit 46 outputs a signal to a pulse drive circuit 50 to control a timing of pulse generation of the pulse light source 30. A gate circuit 48 operates a gate of the gating photodetector 44 in accordance with a signal from the pulse drive circuit 50. An electrical output signal from the gating photodetector 44 is processed by an analyzer unit 47 as sample data. An output signal from the analyzer unit 47 is supplied to the controller unit 46. The controller unit 48 also controls the X-Y scanning unit 14 and the Z displacing unit 24 (omitted in FIG. 1). Thus, the exit light from the sample 16 can be measured while scanning the sample 16. Data on the control signals in the X, Y, and Z directions of the controller unit 46 are temporarily supplied to the analyzer unit 47 to be converted to data that can be displayed. The converted data and the sample data are then supplied to a display 52 and the surface data is displayed on the display 52.

An operation of the near field scanning optical microscope shown in FIG. 1 will be described.

The pulse drive circuit 50 causes the light source 30 to generate probe light having a pulse width of about 50 pS and a pulse separation of about 10 nS. The probe light is incident on the optical probe 28 through the optical guide 32 and so on. The probe light passing through the aperture or pin hole of the optical probe 28 is supplied to the sample 16 present in the near field of the optical probe 28 as an evanescent wave.

Optical energy is transmitted between the optical probe 28 and the sample 16 in accordance with the state of the sample, e.g., the distance to the sample and the optical absorption of the sample, and exit light modulated in accordance with the state of the sample is generated. In this case, the probe light is supplied as the evanescent wave only to a place very close to the pin hole. Hence, the exit light from the sample 16 reflects only the state of the surface portion of the sample which is present very close to the pin hole, and it can be expected that a space resolution corresponding to the diameter of the pin hole be obtained.

The exit light from the sample 16 is focused by the objective lens 40 and incident on the streak camera constituting the gating photodetector 44. The streak camera is controlled by a gate signal from the gate circuit 48 to sweep the exit light from the sample 16 in synchronism with pulse generation of the probe light. More specifically, the exit light from the sample 16 is incident on a photocathode provided on the input side of the streak camera, and photoelectrons corresponding to the exit light are emitted from a photocathode. The photoelectrons are deflected in accordance with the gate signal applied to the deflecting electrodes of the streak camera and caused to sweep on a one-dimensional detector array which is provided on the output side of the streak camera and is aligned perpendicularly to the sweeping direction. A converted electric output which is detected by the detector array and is corresponding to the incident light on the streak camera is input to the controller unit 46.

The controller unit 46 adjusts the position of the optical probe 28 in the Z direction by controlling the Z displacing unit 24, so that a converted electric output which is detected by the detector array each time a probe light pulse is generated becomes constant. When position control of the optical probe 28 in the Z direction is completed, the controller unit 48 controls the X-Y scanning unit 14 to gradually shift the sample 16 on the X-Y plane. When this operation is repeated, displacements of the optical probe 28 in the Z direction can be mapped as a function of the X and Y directions on the surface of the sample 16. That is, the surface information of the sample 16 can be detected. If scattering and reflection of the surface of the sample 16 are uniform, and scattering, reflection, absorption, and the refractive index of the sample 16 are uniform, the configurations of projections and recesses of the sample 16 can be detected. If the surface of the sample 16 does not have a projection or recess, absorption and the like of the sample 16 can be detected. The results are displayed three-dimensionally on the display 52.

In the near field scanning optical microscope in this embodiment, the pulse type of probe light is used. Thus, the intensity at the peak of the probe light can be greatly increased, thus increasing the S/N ratio. That is, since the probe light to be supplied to the optical probe 28 is concentrated within certain periods of time, the ratio of the signal corresponding to the probe light intensity to the noise caused by background light which is constantly present can be increased. As a result, detection of the probe light is facilitated, and lower detection limit can be greatly improved. More specifically, even if the light source has an average output of 100 mW, when probe light having a pulse width of 50 pS and a pulse interval of 10 nS is to be generated by this light source, the peak output becomes 20 W. In this case, comparison will be made with a case in which CW light having an average output of 100 mW is used as the probe light. At this time, since noise caused by the presence of photons of the background stational light is estimated to be constant, if optical detection is performed by gating at every 50 pS pulses, the ratio of the signal component corresponding to the probe light intensity to the constant noise can be increased by 200 times. This signifies that the diameter of the pin hole of the optical probe 28 can be decreased and that the resolution of the near field scanning optical microscope can be improved.

The present invention is not limited to the near field scanning optical microscope of the embodiment described above.

For example, a photon counting streak camera or a microchannel plate-incorporating photomultiplier tube (MCP-PMT) can be used as the gating photodetector 44. In the MCP-PMT, however, the gate time width of the gating photodetector cannot be greatly decreased due to the capacitive operation of the microchannel plate in an ON/OFF operation. The operation is performed at low speed, accordingly. However, the same advantage as that in the above embodiment can be obtained if the gate time width is set to 5 nS and the optical detection interval is set to 0.5 $\mu$S.

A semiconductor laser can be used as the pulse light source 30. In this case, although a very large peak output cannot be obtained, a small, inexpensive pulse light source having good electric controllability can be obtained.

Figure 2:
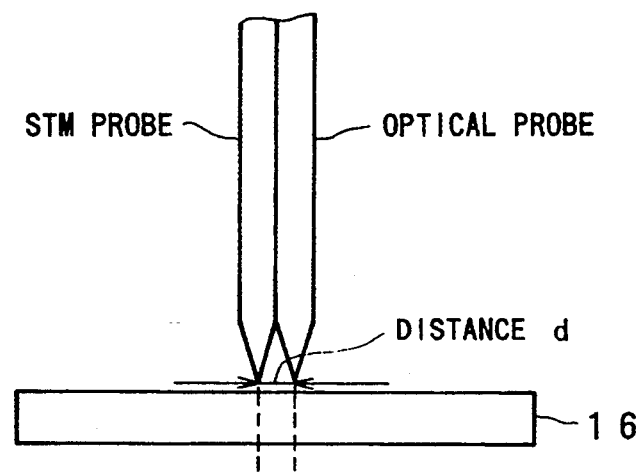
FIG. 2 is a view showing a method which uses an STM as well.
Figure 3:
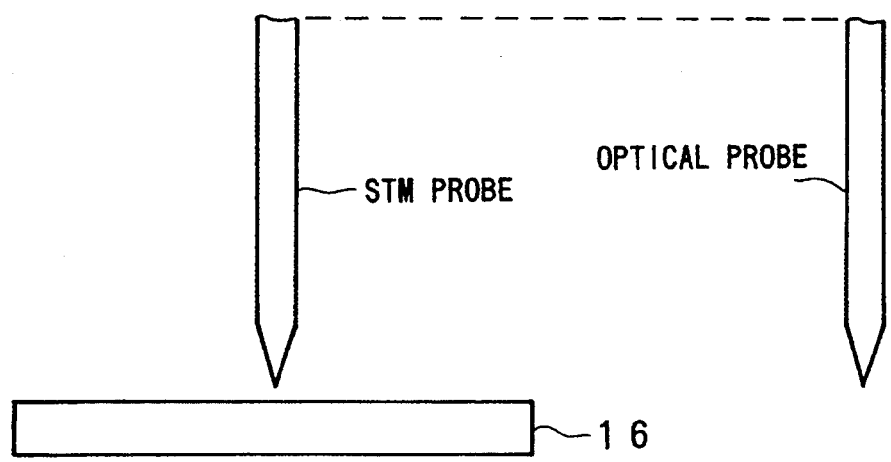
FIG. 3 is a view showing another method which uses the STM as well.

If projections and recesses are not present on the surface of the sample, the optical probe 28 is not displaced in the Z direction, but the sample 16 may be scanned on the X-Y plane and a detected signal from the gating photodetector 44 may be measured. In this case, the measurement result corresponds to the absorbance of the sample. When the sample 16 has an electric conductivity, a scanning tunneling microscope (STM) may also be used to detect data on the surface configurations of recesses and projections. The distance between the optical probe 28 and the surface of the sample 16 is kept constant in response to the output of STM, and data other than the surface configurations can be detected more accurately. Two methods are available for employing the STM. According to the first method, an STM probe and an optical probe are disposed close to each other, as shown in FIG. 2. At this time, memories corresponding to the number obtained by dividing a distance d at the distal ends of the two probes by a minimum movement-controllable step a in the X (or Y) direction are arranged in the analyzer unit 47. Data on recesses and projections of the surface detected by the STM are stored in the analyzer unit 47. Data on a recess or projection is read out when the optical probe comes to the projection or recess, and its Z position is determined to perform measurement. According to the second method, the two probes are spaced apart from each other by a distance larger than one side of the sample 16, as shown in FIG. 3. The sample is scanned in the X and Y directions by the STM temporarily, and all the data on recesses and projections of the surface obtained by this scanning are stored in the analyzer unit 47. Measurement by the optical probe is performed on the basis of this data.

With the first method, the memory capacity can be small, the arrangement is simple, and measurement can be performed within a short period of time. However, if an extreme recess or projection is present within the distance d of the sample 16, one probe interferes with the other probe so that the other probe cannot approach the sample, and measurement sometimes becomes impossible. Regarding the second method, although the arrangement is complicated and a large memory capacity is needed, measurement can be performed without being subjected to such a limitation as that in the first method.

When the sample 16 does not have an electrical conductivity, a scanning type atomic force microscope (AFM) can be employed as well to perform measurement. In this case, measurement similar to that described above can be performed by obtaining data on the surface configurations from the AFM.

A fluorescent substance can be used as a sample 16 to measure its fluorescence life time. In this case, pulse-like probe light from a pulse light source 30 is used as an excitation light source. In addition, the gating photodetector 44 is not only operated simultaneous with the probe light but also operated in accordance with a sampling time required for extracting predetermined portions of the time-dependent distribution of the fluorescent light amount. Further, one point of the sample 16 can be observed by gradually changing the sampling time. When a streak camera is used as the photodetector, a detector array may be arranged parallel to the streak sweeping direction, unlike in the embodiment described above, and light may be intensively incident on the photocathode of the camera by focusing the light to a point. Then, time resolution of the fluorescent emission can be performed at once. As a result, the time characteristics of the fluorescent emission of the sample 16 can be detected at a time resolution of the gate time of the photodetector, thus widely identifying the material of the sample. If the sample 16 is scanned on the X-Y plane, a map representing the fluorescence life time of the sample surface can be obtained.

A prism or any other spectroscope can be provided before the gating photodetector 44. In this case, when light components at different wavelengths from the objective lens 40 are divided in line and incident on the incident-side slit of the streak camera, the spectrum profile of the sample 16, e.g., fluorescent emission can be detected, thereby identifying the material of the sample 16 more precisely. When the photodetector is an MCP-PMT, the light components at different wavelengths from the objective lens 40 may be sequentially changed to perform the same detection. If the sample 16 is scanned on the X-Y plane, the map of the spectrum peak or spectrum width of the sample surface can be obtained.

When a streak camera is used as the photodetector, the detector array may be used as a two-dimensional detector, e.g., a CCD camera, so that time division and spectroscopy of output light from the lens 40 can be performed simultaneously. In this case, X-Y scanning may be performed once to obtain maps of the spectrum peak, the spectrum width, the fluorescence life time, and so on, simultaneously.

The optical probe 28 can be scanned in the X and Y directions by the X-Y scanning unit 14. Alternatively, the sample 16 can be displaced in the Z direction by the Z displacing unit 24.

A laser having a variable wavelength can be used as the light source, and not only a visual radiation but also various types of radiations can be used.

The optical probe 28, the objective lens 40, and so on can be used at other measurement modes. For example, the sample may be irradiated from its lower surface by using the objective lens 40, and light transmitted through the sample may be detected by an optical probe close to the surface of the sample. Further, light emitted by the optical probe close to the surface of the sample and reflected by the surface of the sample may be detected by the same optical probe. A pulse beam wave may obliquely radiate a wide range of the sample and a near field optical system may be used only for optical detection.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A near field scanning optical microscope comprising:
    a light source for generating light to be radiated on a sample which is positioned in a sample set position, where the intensity of said light is changed in a pulse-like manner;
    near filed optical means for outputting light corresponding to said sample, where said near field optical means has an aperture through which said light passes facing said sample set position, said aperture being movable in a direction substantially perpendicular to a surface of said sample;
    receiving means for receiving light from said sample;
    scanning means for two-directionally scanning said sample on a plane perpendicular to a moving direction of said aperture;
    supplying means for supplying said light from said light source to said sample set position through said aperture;
    detecting means for detecting said light from said near field optical means after a predetermined time has elapsed from when a light pulse generated by said light source rises, for converting said detected light into an electrical signal in synchronization with said intensity of said pulse-like light, and for outputting said electrical signal; and
    sub-probe means for determining a difference between said light supplied by said supply means and said light output from said near field optical means using said detecting means electrical signal output,
    wherein a time interval between a time when said light pulse generated by said light source rises and a time when said detecting means detects said light output from said near field optical means is adjustable,
    said detecting means isolates and detects light having a predetermined wavelength different from that of a light pulse generated by said light source,
    said sub-probe means detects data on a surface configuration of said sample at said sample position, and
    said optical probe means moves said aperture corresponding to an output from said sub-probe means to maintain a predetermined distance between said surface of said sample and said aperture.

2. A near field scanning optical microscope comprising:
    a light source for generating light to be radiated on a sample which is positioned in a sample set position, where the intensity of said light is changed in a pulse-like manner;
    near field optical means for outputting light corresponding to said sample, where said near field optical means has an aperture through which said light passes facing said sample set position, said aperture being movable in a direction substantially perpendicular to a surface of said sample;
    receiving means for receiving light from said sample;
    scanning means for two-directionally scanning said sample on a plane perpendicular to a moving direction of said aperture;
    supplying means for supplying said light from said light source to said sample set position through said aperture;
    detecting means for detecting said light from said near field optical means simultaneously when said light source generates a light pulse, for converting said detected light into an electrical signal in synchronization with said intensity of said pulse-like light, and for outputting said electrical signal; and
    sub-probe means for determining a difference between said light supplied by said supply means and said light output from said near field optical means using said detecting means electrical signal output,
    wherein a time interval between a time when said light pulse generated by said light source rises and a time when said detecting means detects said light output from said near filed optical means is adjustable,
    said detecting means isolates and detects light having a predetermined wavelength different from that of a light pulse generated by said light source,
    said sub-probe means detects data on a surface configuration of said sample at said sample position, and
    said optical probe means moves said aperture corresponding to an output from said sub-probe means to maintain a predetermined distance between said surface of said sample and said aperture.

3. A microscope according to claim 2, wherein
    said detecting means comprises a streak camera which sweeps according to a gate signal which is synchronized with a light pulse generated by said light source,
    said detecting means comprises a pulse drive unit for adjusting time when said light source generates said light pulse and time when said streak camera is caused to sweep,
    said detecting means comprises spectroscopic means for separating said light output from said near field optical means in units of wavelengths, and a streak camera which receives light from said spectroscopic means which sweeps according to a gate signal which is synchronized with a light pulse generated by said light source, and said sub-probe means is comprised of at least one of a group consisting of an AFM and an STM.

4. A microscope according to claim 1, wherein said near field optical means comprises pickup means for picking up light from said sample set position.

5. A microscope according to claim 1, wherein said near field optical means comprises optical probe means for picking up said light from said sample set position through said aperture.

6. A microscope according to claim 1, wherein said near field optical means comprises optical probe means for both picking up said light from said sample set position through said aperture and for serving as said supplying means.

7. A microscope according to claim 1, wherein said near field optical means comprises pickup means for picking up light from said sample set position, wherein said supplying means comprises an optical fiber and said aperture comprises an opening in a metal thin film formed at a distal end portion of said optical fiber.

8. A microscope according to claim 1, wherein said near field optical means comprises optical probe means for picking up said light from said sample set position through said aperture, and wherein said optical probe means comprises an optical fiber and said aperture constituted by an opening in a metal thin film formed at a distal end portion of said optical fiber.

9. A microscope according to claim 1, wherein said detecting means detects said light output from said near field optical means after a predetermined time has elapsed from when a light pulse generated by said light source rises.

10. A microscope according to claim 1, wherein said detecting means detects said light from said near field optical means simultaneously when said light source generates a light pulse.

11. A microscope according to claim 1, wherein said detecting means comprises a streak camera which is caused to sweep by a gate signal which is synchronized with said intensity of said light pulse generated by said light source.

12. A microscope according to claim 1, wherein said detecting means comprises a streak camera which is caused to sweep by a gate signal synchronized with a light pulse generated by said light source, and wherein said detecting means comprises a pulse drive unit for adjusting time when said light source generates said light pulse and time when said streak camera is caused to sweep.

13. A microscope according to claim 1, wherein said detecting means comprises an MCP-PMT which operates in synchronism with said intensity of said light pulse generated by said light source.

14. A microscope according to claim 1, wherein said detecting means isolates and detects light having a predetermined wavelength different from a wavelength of said light pulse generated by said light source.

15. A microscope according to claim 1, wherein said detecting means comprises spectroscopic means for separating said light output from said near field optical means in units of wavelengths, and a streak camera which receives light from said spectroscopic means and is caused to sweep by a gate signal synchronized with said intensity of said light pulse generated by said light source.

16. A microscope according to claim 1, wherein said detecting means comprises spectroscopic means comprised of a prism and a slit for passing only light having a predetermined wavelength from said prism, thereby separating said light output from said near field optical means in units of wavelengths, and a streak camera which receives light from said spectroscopic means and is caused to sweep by a gate signal synchronized with said intensity of said light pulse generated by said light source.

17. A near field scanning optical microscope comprising:
   illumination means for illuminating a sample positioned in a sample set position with intensity-pulsed light;
   near field optical means for receiving light from said sample, said near field optical means having an aperture facing said sample set position;
   detecting means for detecting light from said near field optical means and for converting said detected light into an electrical signal in synchronization with said intensity of said intensity-pulsed light;
   means for adjusting the distance between said aperture and said sample based on said electrical signal; and
   means for displaying an image corresponding to said sample based on said detected light from said detecting means.

18. A near field scanning optical microscope comprising:
   illumination means for illuminating a sample positioned in a sample set position with intensity-pulsed light;
   near field optical means for receiving light from said sample, said near field optical means having an aperture facing said sample set position;
   detecting means for detecting light from said near field optical means and for converting said detected light into an electrical signal in synchronization with said intensity of said intensity-pulsed light;
   means for adjusting the distance between said aperture and said sample based on said electrical signal; and
   means for displaying an image corresponding to said sample based on said detected light from said detecting means,
   where a time interval between when said intensity-pulsed light is generated and when said detecting means detects said light from said near field optical means is adjustable.

* * * * *